(No Model.)
C. SCHUETZ.
WATCH CASE.
No. 296,631.  Patented Apr. 8, 1884.
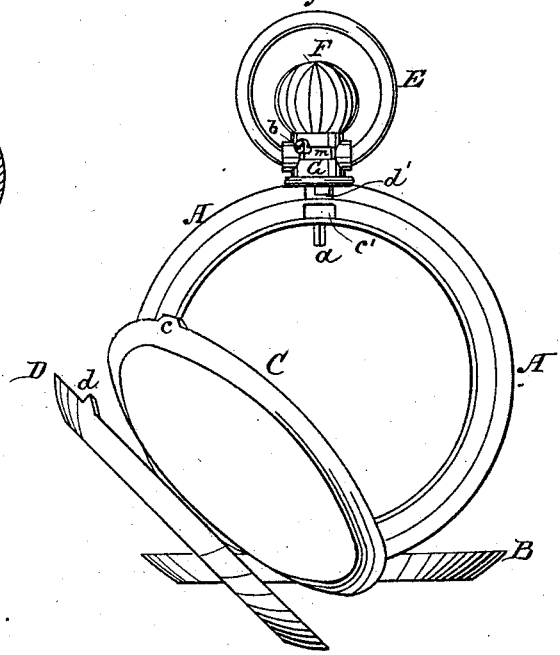
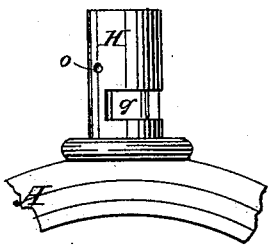
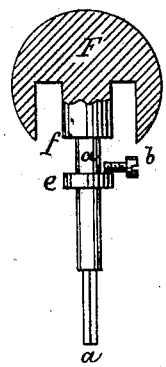
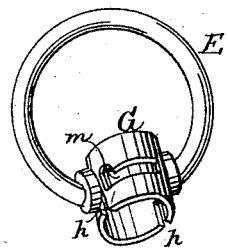
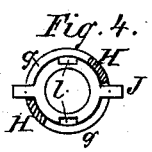
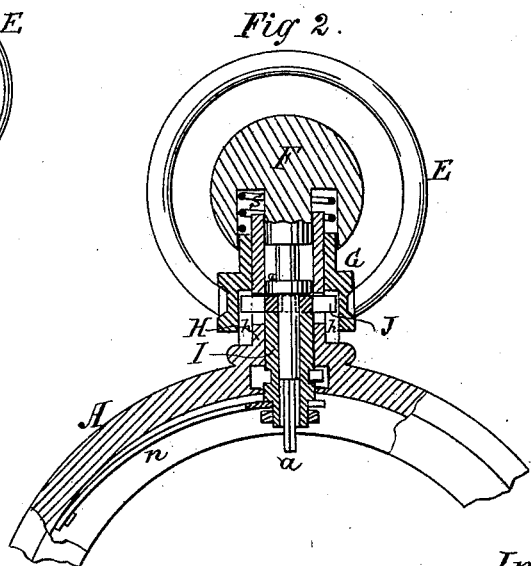
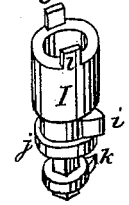
Witnesses.
A. Faber du Faur
George Webner
Inventor.
Charles Schuetz

UNITED STATES PATENT OFFICE.

CHARLES SCHUETZ, OF NEWARK, NEW JERSEY.

WATCH-CASE.

SPECIFICATION forming part of Letters Patent No. 296,631, dated April 8, 1884.

Application filed December 6, 1883. (No model.)

*To all whom it may concern:*

Be it known that I, CHARLES SCHUETZ, a citizen of the United States, residing at Newark, in the county of Essex and State of New Jersey, have invented new and useful Improvements in Watch-Cases, of which the following is a specification.

My invention refers to improvements in watch-cases; and it has for its object to provide convenient means for opening the backs or fronts of such cases. I attain this object by the mechanism illustrated in the accompanying drawings, in which—

Figure 1 is a view of the back of the watch-case with the covers open; Fig. 2, a section of the stem and body of the case; and Figs. 3 to 7 represent details enlarged.

Similar letters refer to similar parts throughout the several views.

In Fig. 1, A is the body of the watch-case; B, the front cover; C, the inner and D the outer back cover; E, the ring; F, the knob, and G a sleeve, of which Fig. 3 is a detailed view in perspective. $a$ is a shank attached to the knob F; $b$, a small screw, the head of which is within a groove or slot, $m$, of the sleeve G. $c$ and $d$ are small steel lugs attached to the covers C and D, and passing into slots $c'$ $d'$ when the covers are closed.

Fig. 6 is an elevation of the hollow stem H, forming part of the case A. This stem H has two slots, $g$, diametrically opposite, which slots are also shown in Fig. 4. It also has a threaded hole, $o$, for the above-mentioned small screw $b$. The knob F is shown enlarged in Fig. 7, together with the shank $a$. This shank $a$ has a flange, $e$, an annular recess being formed between this flange $e$ and the shoulder $f$ on the knob F, into which recess the inner end of the screw $b$ projects. To the square end of the shank $a$ the usual means for winding are connected.

Fig. 5 shows a hollow cylinder, I, with two cams, $i$ and $k$, and with two lugs, $l$. A ring, J, Figs. 2 and 4, with two projecting arms, fits on the outer end of the cylinder I, the lugs $l$ entering corresponding notches of the ring J.

$n$, Fig. 2, is a spring such as generally used in catch-cases for locking and opening the front. This spring $n$ has a hole, through which the inner end of the cam-cylinder I passes, the shoulder $j$ of which rests on the spring.

In putting the several parts together, as in Fig. 2, the ring J is first placed into hollow stem H by inserting it through one of the slots $g$. Then the cylinder I, with its cam $i$, is passed into the stem H from the inside of the case A and pushed up to the ring J, so that its projecting lugs $l$ occupy the corresponding notches of the ring J. The spring $n$ may now be secured in place in the usual manner, and the inner cam, $k$, placed upon the square end of the cylinder I. The sleeve G is passed over the hollow stem H, the projecting arms of the ring J entering the notches $h$ of the sleeve. A spring, S, is placed into the annular groove of the knob F, the ring E turned down, and the shank $a$ passed into the hollow stem H and into the cylinder I to the position shown in Fig. 2. Finally the small screw $b$ is passed through the slot $m$ of the sleeve G, and screwed into the hole $o$ of the stem H far enough for its inner end to project into the annular recess of the stem $a$ between the knob and the flange $e$, while the head of the screw is within the slot $m$ of the sleeve G. The notches $g$ are wider than the ring J and its arms, so as to allow small longitudinal motion of the ring J. The sleeve G can be turned and also moved longitudinally on the stem H, the extent of both motions being limited by the slot $m$ of the sleeve G and by the head of the screw $b$. When the sleeve G is in the position shown in Fig. 1, with the head of the screw $b$ in the short arm of the L-shaped slot $m$, it cannot be turned; but by pulling the ring E and sleeve G out against the spring S the head of the screw $b$ enters the long arm of the slot $m$, so that the sleeve G can be turned. By turning the sleeve G, the cams $k$ and $i$ act upon the surfaces of the lugs $c$ and $d$ and force the covers C and D open. The sleeve is then returned to the position Fig. 1, when the backs can be closed again.

It will be noticed from the above description that, in addition to my improved means for opening the covers, means are provided for operating the stem - winding mechanism—namely, the knob F and the shank $a$—and also the usual means for opening the front by pushing the knob inward, so that the flange $j$ of the cylinder I forces the spring $n$ toward the center of the case.

The above description refers to my invention as applied to the case of a stem-winder, For ordinary cases of key-winders the arrangement is greatly simplified. The cam-cylinder I may be rigidly connected to the shank $a$ and knob F. The sleeve G may be one piece with the stem H, and the cam-cylinder be operated by the knob F. In this case the cylinder I can be turned all round, so that one cam may serve to open a front cover as well as a back cover.

As shown and described, my invention consists, essentially, in the combination of a watch-case with its cover or covers and with a hollow stem, a cam-cylinder located within the hollow stem, and means for retaining the cylinder in its place and for turning it from the outside, for the purpose of bringing the cams in operation.

The means for turning the cam-cylinder may be varied according to circumstances. When the knob is required for winding, the sleeve H and ring E are used. In key-winders the knob F may be used for operating the cam-cylinder.

Having fully described my invention, what I desire to claim and to secure by Letters Patent is—

1. The combination, with the watch-case, of the attached tubular stem, the cylinder arranged to rotate within said stem, and having at its inner extremity a cam or cams, and means connecting with the cylinder from the exterior of the hollow stem to rotate the cylinder within the stem, substantially as described.

2. The combination, with the watch-case, of the attached tubular stem, the hollow cylinder arranged to rotate within said stem, and having at its inner extremity a cam, a shank extending through the cylinder and carrying the knob or ball, and means connecting with the cylinder from the exterior of the hollow stem to rotate the cylinder within the stem, substantially as described.

3. The combination of the body of a watch-case with one or more covers and with a hollow stem, a cylinder located within the hollow stem, and provided with one or more cams which act against a surface or against surfaces of the cover or covers, a sleeve placed upon the stem and connected with the cylinder, and means for retaining the cylinder and the sleeve in place, while allowing them to be turned for bringing the cams into operation, substantially as and for the purpose specified.

4. The combination of the body A of a watch-case with one or more covers and with a hollow stem, H, a cylinder, I, located within the hollow stem H, and provided with one or more cams, $k$ $i$, which act against suitable surfaces of the cover or covers, a ring, J, with projecting arms, and with notches for the lugs $l$ of the cylinder I, a sleeve, G, with notches $h$ to receive the projecting arms of the ring J, and with a slot, $m$, a knob, F, shank $a$, and screw $b$, constructed and operating substantially as specified.

In testimony whereof I have hereunto set my hand in the presence of two subscribing witnesses.

CHARLES SCHUETZ.

Witnesses:
A. FABER DU FAUR,
GEORGE WEBNER.